United States Patent [19]

Haun et al.

[11] Patent Number: 5,189,587
[45] Date of Patent: Feb. 23, 1993

[54] DUAL SHUNT CURRENT REGULATOR

[75] Inventors: Andy A. Haun; Earl J. Tessmer, both of Cedar Rapids, Iowa

[73] Assignee: Square D Company, Palatine, Ill.

[21] Appl. No.: 558,130

[22] Filed: Jul. 24, 1990

[51] Int. Cl.⁵ .............................................. H02H 9/04
[52] U.S. Cl. ...................................... 361/56; 361/88; 361/91
[58] Field of Search ...................... 361/56, 111, 91, 88, 361/58, 18; 323/274, 276, 281

[56] References Cited

U.S. PATENT DOCUMENTS 3,539,865  11/1970  Billings .................................. 361/56

Primary Examiner—Todd E. DeBoer
Attorney, Agent, or Firm—Larry I. Golden; Kareem M. Irfan

[57] ABSTRACT

A current regulator circuit for shunting excess current from a current supply utilizes two separate shunting paths, depending on the amount of excess current on the supply line. The first shunting circuit is activated when the current exceeds some minimum level established by a zener diode. The second current shunting circuit is selectively activated by a switching circuit which compares the current in the first shunting circuit to a reference voltage that is proportional to the line current. This arrangement is advantageous in that it shunts excess current without generating significant levels of heat or adversely affecting current sensing devices.

8 Claims, 2 Drawing Sheets

DUAL SHUNT CURRENT REGULATOR

FIELD OF THE INVENTION

This invention relates generally to current regulators and, more particularly, to a solid state current shunting circuit arrangement for controlling the amount of current applied to a load.

DESCRIPTION OF THE PRIOR ART

Solid state current regulators are commonly used in conjunction with power supplies to protect electrical circuits and devices coupled thereto. Such regulators are commonly use in circuit interruption tripping systems for 3-phase power lines. In this application, a solid state current regulator controls the amount of current provided from the 3-phase power line to the system power supply. As the magnitude of the power in the line increases beyond a prescribed limit, the current regulator responds by shunting excess current from the line to system ground.

Known current regulators may be categorized as being either a linear shunt type regulator or a switched shunt type regulator. A typical linear shunt type regulator includes a resistor and zener diode arranged in series between the current line and ground with their interconnection controlling the base of a P-N-P Darlington transistor. When the current magnitude in the line exceeds the breakdown voltage of the zener diode, the Darlington transistor is enabled, and the excess current from the current line is shunted through the Darlington transistor to ground. This type of regulator is useful and desirable when the current level in the line is low. However, it consumes a significant amount of power, due to the regulated voltage across the transistor, when the current level in the line is high. In applications where significant levels of heat cannot be dissipated or where space or cost do not accommodate heat sinking devices, this type of shunting arrangement is unacceptable.

Switched current shunting arrangements typically involve a more complex arrangement of circuitry to enable the current path to be shunted from the line to ground. For example, in U.S. Pat. No. 4,809,125, by Matsko et al., a power supply circuit employs a custom design IC (integrated circuit) for monitoring the current level of the line and controlling the bias on a transistor which is selectively enabled to shunt excess current from the line to ground. Another known type of switched current shunting arrangement employs a comparator and a voltage divider circuit at an input of the comparator for determining when to enable a transistor which shunts the excess current from the line to ground.

While switched current shunting arrangements may be controlled so that they do not exhibit the heat dissipation problem (familiar to linear shunt type regulators), they are also not without fault. One of most significant problems associated with a switched current shunting arrangement is its tendency to generate unacceptable levels of noise. This can and does significantly impair circuit operation in certain applications. For instance, in a circuit interruption tripping system using current transformers to sense and induce the current from the line, a switched current shunting arrangement can affect the electromagnetics of the current transformers and cause them to misrepresent the true current levels in the line. Under certain conditions, the electromagnetic flux in the sensor will collapse, inducing a sensor current to the extent that the tripping system will determine that a fault has occurred and command an interruption.

Accordingly, there is a need for a current regulator which overcomes the above problems associated with the prior art.

OBJECTS AND SUMMARY OF THE INVENTION

It is an object of the present invention to provide a current regulator which provides essentially noise-free operation and avoids generation of excessive heat.

It is another object of the present invention to provide a current regulator which uses a first shunting path to accommodate current regulation for normal level currents and a second shunting path to accommodate current regulation for higher level currents.

According to a preferred embodiment, the present invention includes a circuit arrangement for controlling the amount of supply current in a current path between a current source and a load. The arrangement has a first detector for detecting a current level in the supply current which exceeds a first threshold, and a first shunting circuit, responsive to the first detector, for shunting a portion of the supply current from the current path. Further, a second detector responds to the first detector to detect a current level in the supply current that exceeds a second threshold which is greater than the first threshold. A second shunting circuit acts in response to the second detector to shunt a portion of the supply current from the current path, so that the second detection means selectively enables the second shunting circuit to allow the second shunting circuit to shunt higher levels of supply current than the first shunting circuit for prescribed time intervals.

BRIEF DESCRIPTION OF THE DRAWINGS

Other objects and advantages of the invention will become apparent upon reading the following detailed description and upon reference to the drawings in which.

Figure 1:
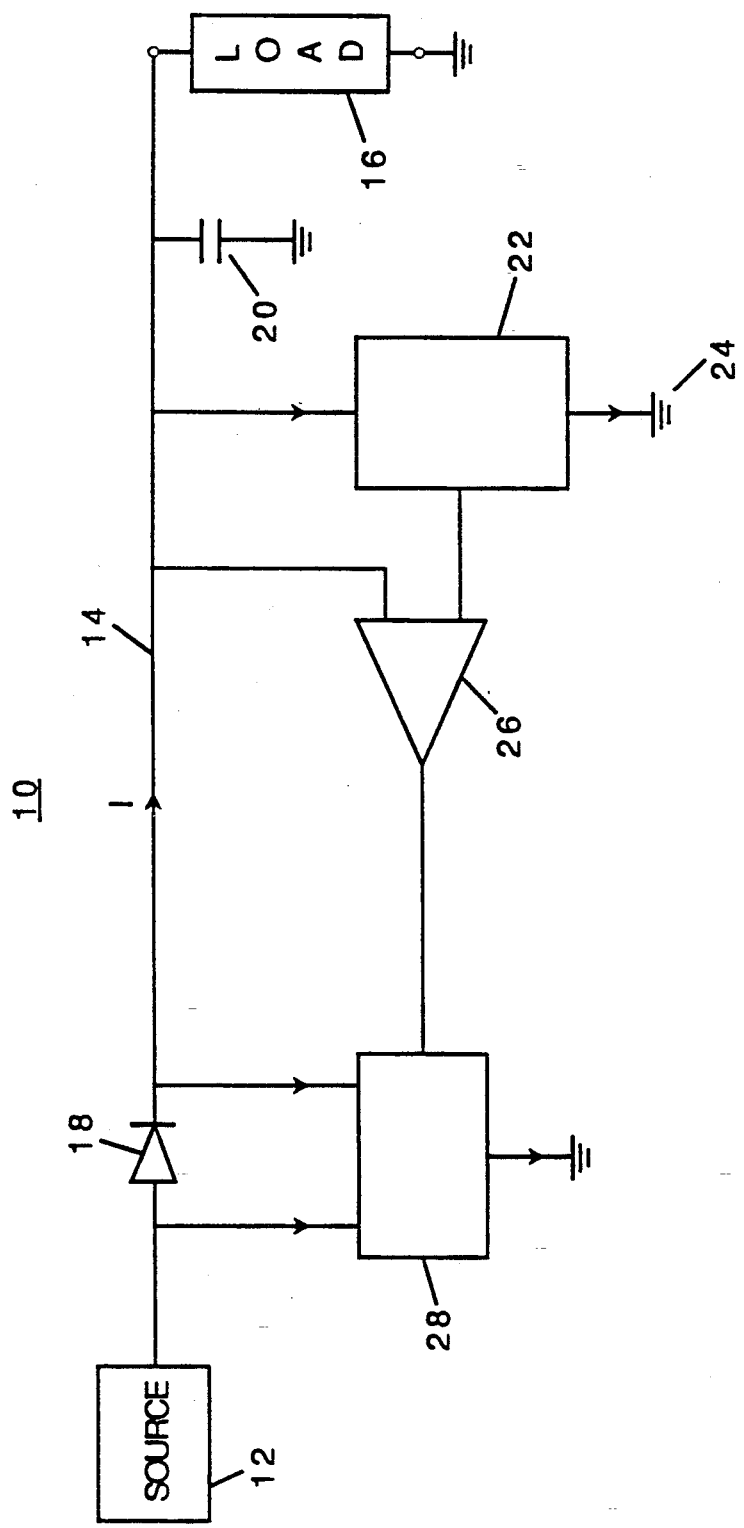
FIG. 1 is a block diagram of a circuit arrangement, in accordance with the present invention, for controlling the amount of supply current from a current source to a load.

While the invention is susceptible to various modifications and alternative forms, specific embodiments thereof have been shown by way of example in the drawings and will herein be described in detail. It should be understood, however, that it is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE PREFERRED EMBODIMENTS

The present invention has direct application for sensing and shunting excess current in a current path in an electrical distribution system. While any type of current source may benefit from the present invention, it is particularly useful for monitoring and shunting current in circuits drawing power from three-phase power lines.

Turning now to the drawings, FIG. 1 is a block diagram depicting an embodiment of the present invention for general application. A circuit arrangement 10 is shown controlling the amount of current supplied from a current source 12 along a line 14 to a load 16. The current on the line 14 passes through a blocking diode 18 and charges a capacitor 20. When the source current exceeds a first threshold level and charges the capacitor 20 to a prescribed voltage, a linear shunt regulator circuit 22 allows current to flow to a circuit neutral terminal 24, thereby shunting the excess current to ground.

At the output of the linear shunt regulator circuit 22, a sensor voltage signal is provided in proportion to the current passing through the linear shunt regulator circuit 22. A switching circuit 26 receives both the sensor voltage signal and a reference voltage signal (not shown in FIG. 1), the latter of which is also preferably proportional to the supply current, to determine if the current level in the line has exceeded a second threshold level. If the current level in the line has exceeded that second level, an additional shunting path, via a second shunting circuit 28, is selectively enabled to provide the necessary current regulation when the current in the line 14 is at high levels.

Figure 2:
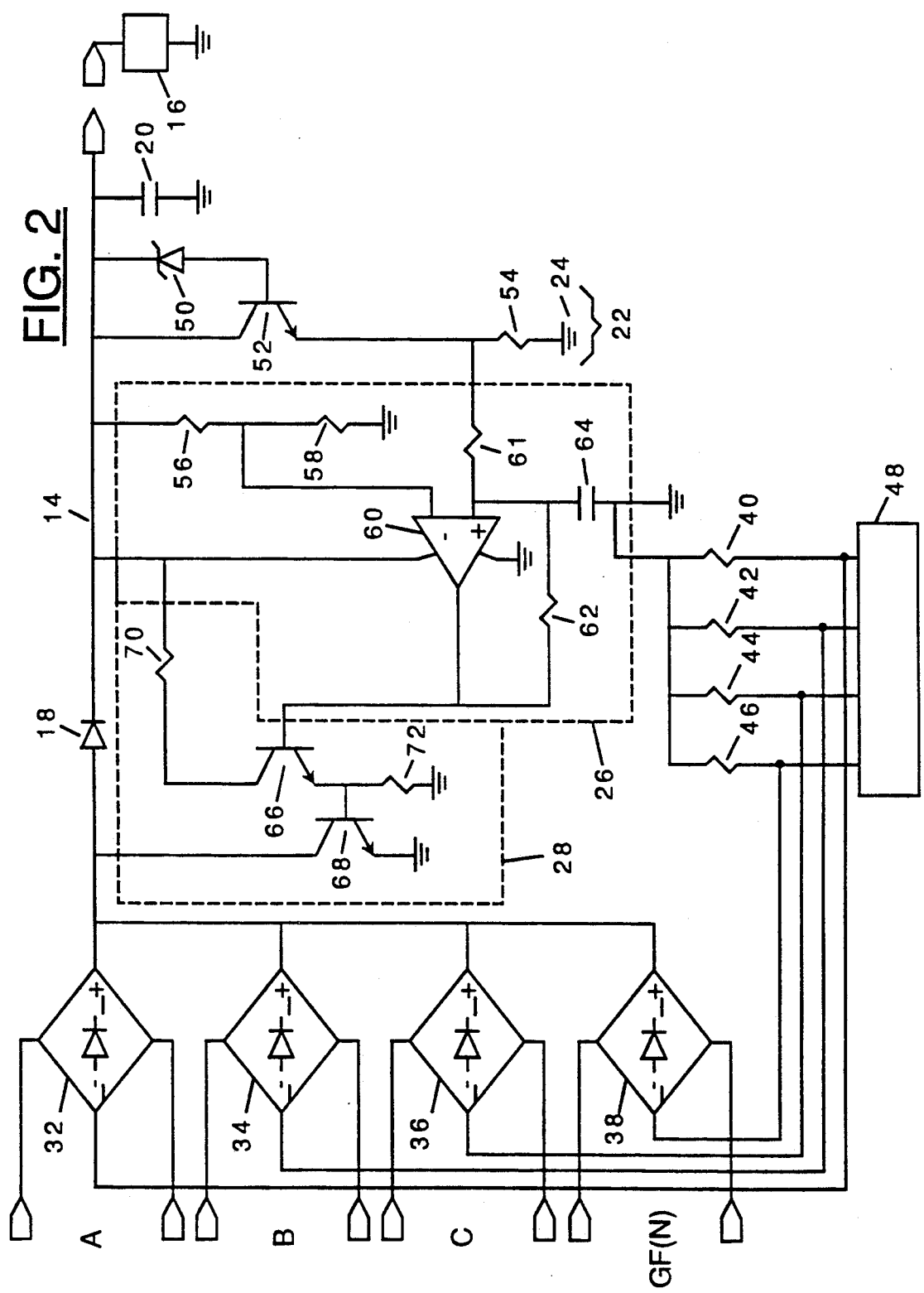
FIG. 2 is a schematic diagram of a preferred embodiment of the circuit arrangement of FIG. 1 for a particular application.

FIG. 2 is a schematic diagram of a preferred embodiment of the circuit arrangement of FIG. 1 for the specific application of monitoring and shunting current in circuits drawing power from three phase power lines. In FIG. 2, the current supplied on the line 14 is a current summation of current sensed from a three-phase power line arrangement (not shown). Current transformers (not shown) provide induced current from the three phases (A, B, C and N), and the ground fault summation (GF=Σ(A+B+C+N) to one of four full-wave rectifiers 32, 34, 36 and 38, whose outputs are interconnected at the anode of the diode 18 to provide the current on line 14.

The rectifiers may be used to provide a desirable interface between the three-phase lines and the remaining aspects of the circuit arrangement so that the three-phase lines may be accurately monitored. On the left side of each of the rectifiers, negative phase current signals are carried through a series of burden resistors 40, 42, 44 and 46. The values of these burden resistors are selected for the multiple phases and current transformers so that known voltages may be developed which correspond to the magnitudes of the current in the line 14. The developed voltages are then used for subsequent processing and fault analysis by a microcomputer 48, for example, in a tripping system or current monitoring system.

On the right side of each of the rectifiers, positive phase currents are summed and act as the source for the current supplied on line 14.

The current supplied on line 14 is monitored and responded to at two different thresholds, as discussed in connection with FIG. 1. The first threshold is established by a zener diode 50, a transistor 52 and a resistor 54 within the linear shunt regulator circuit 22. When the voltage on the capacitor 20 charges beyond the breakdown region of the zener diode 50, the base-emitter junction of the transistor 52 becomes forward biased, and a current path develops from the line 14 through the base-emitter junction of transistor 52 and through resistor 54 to ground or a designated common neutral terminal.

The second threshold level is defined in the switching circuit 26 by a pair of resistors 56 and 58 at the input of a comparator 60. The comparator 60 monitors the voltage at the emitter of the transistor 52 through a resistor 61. This emitter voltage increases in proportion to the excess current on the line 14. When the emitter voltage reaches the reference voltage established by the resistors 56 and 58, the comparator 60 enables the second shunting circuit 28 to provide additional shunting of the excess current from the line 14.

Like the voltage at the emitter of the transistor 52, the reference voltage established through the resistors 56 and 58 is also proportional to the supply current in the line 14. The rate of increase by the reference voltage with respect to the line voltage held by capacitor 20 is defined by the ratio of the resistors 56 and 58. Using a 10:1 ratio between the resistors 56 and 58, for example, for every ten volts of increased charge on the capacitor 20, the reference voltage increases one volt. In contrast, the voltage at the emitter of the transistor 52 follows the line voltage held by capacitor 20 volt-for-volt in excess of the zener breakdown voltage. Thus, while both voltage levels increase with the supply current as they are monitored by the comparator 60, using the above example, the voltage at the emitter of the transistor 52 will increase (or decrease) ten times faster than the reference voltage defined by the resistors 56 and 58.

These line-dependent voltage levels are used by the comparator to provide hysterisis-like control to the second shunting circuit 28. Positive feedback around the comparator 60 is provided by a resistor 62 and a capacitor 64 to force the output of the comparator 60 to follow the emitter voltage of the transistor 52 and, therefore, the voltage on the line 14. As soon as the line voltage reaches the second threshold, the comparator 60 enables the second shunting circuit 28, which is defined in FIG. 2 by transistors 66 and 68 and resistors 70 and 72, to discharge the capacitor 20 for a brief interval through the respective current paths defined by the base-emitter junction of transistor 52 and the resistor 54, the base-emitter junctions of transistors 66 and 68 and the resistors 70 and 72, the load 26 and the resistors 56 and 58. Based on the discharge period of the capacator 20 and the associated discharge paths, the switch frequency is faster than the *LR* characteristic of the current transformer and the load circuits. Thus, when switching occurs, the electromagnetics are not adversely affected.

As an example, consider the following preferred values for the components illustrated in FIG. 2: resistors 54, 56, 58, 61, 62, 70 and 72 having the values 20, 100 k, 10 k, 4.7 k, 100 k, 1.8 k and 1.8 k Ohms, respectively; and capacitors 20 and 64 having values of 100 microfarads and 2200 picofarads, respectively. Additionally, assume that the zener diode 50 has a 12 volt breakdown, and that transistors 52, 66 and 68 are TIP41, 2N3904 and TIP142 types, respectively. The comparator 60 may be implemented using a conventional LM358 type operational amplifier circuit.

In this example, before any excess current is developed on the line 14, the output of the comparator 60 will be in its logic low state and the transistors 52, 66 and 68 will not be shunting current from the line 14. Consequently, the voltage at the emitter of transistor 52 will be approximately at the level of the neutral terminal 24. When the excess current charges the capacitor 20 to the extent that the breakdown voltage of the zener diode 50 is reached, the transistor 52 begins to shunt current from the line 14, thereby causing the level of the reference voltage of the resistors 56 and 58 to fall at one tenth of the rate of the voltage at the emitter of the transistor 52. The output of the comparator 60 will remain low until the line voltage forces the voltage at the emitter of the transistor 52 to exceed the reference voltage, at which time the output of the comparator 60 will transit to the high state.

Once the output of the comparator 60 is high, the transistor 68 will draw current from the line 14 to allow the voltage on the capacitor 20 to slowly discharge from the line 14 on the cathode side of the diode 18 through the transistor 66 and the resistors 70 and 72, the linear shunt regulator circuit 22, the load 16 and the switching circuit 26. The discharge rate is substantially defined by the RC time constant of these components. The blocking diode 18 prevents the transistor 68 from discharging the capacitor 20 so that the output of the comparator 60 will remain high for the prescribed discharge time. The RC time constant defined by resistor 62 and capacitor 64 also determines the frequency at which the output of the comparator 60 will transit from low to high, assuming a steady state current in the line 14.

It is also important to note that there is a negligible amount of heat generated through the linear shunt regulator circuit 22, and no noise generated from the second shunting circuit 28 at low current levels below switch level. The dissipated heat can be ignored because the transistor 52 is only required to shunt low levels of current from the line 14, and its associated shunting path is defined by the resistor 54 preferably having a relatively small value, e.g., 20 Ohms.

The lack of noise is a consequence of the band width of the current transformers and the hysterisis being selectively controlled to provide a frequent transit rate at the output of the comparator 60. This frequency is relatively fast, so that the noise generated is limited and above the band width of the current transformers. Thus, the noise problem that is common to many of the prior art switched shunt current regulator circuits is alleviated.

Accordingly, by using the linear shunt regulator circuit 22 for low current level currently and by selectively enabling the second shunting circuit 28 for shunting higher level current, only for only brief intervals and at a relatively high frequency, the noise and heat problems of the prior art current regulators may be avoided.

While the present invention has been described with reference to the embodiments of FIGS. 1 and 2, those skilled in the art will recognize that many changes may be made thereto without departing from the spirit and scope of the present invention. As an example, the comparator 60 may be replaced by a timer circuit for controlling the frequency of the activation of the second shunting circuit 28. It would also not be a departure from the present invention to program a microcomputer to activate one or both of the shunting paths in response to the detection of certain current levels in the line. These and like changes do not detract from the intended scope of the present invention, which is set forth in the following claims.

What is claimed is:

1. A current regulator circuit for regulating a supply current flowing in a current path between a current source and a load, comprising:
   a current blocking means in the current path for preventing current from flowing through the current blocking means in a direction from the load to the source;
   a capacitor coupled to the current path on the load side of the current blocking means;
   a first shunting circuit, coupled to the current path on the load side of the current blocking means, for shunting prescribed current levels from the current path, and including:
      a zener diode coupled to the current path on the load side of the current blocking means, for passing current when the supply current exceeds a first threshold level, and
      switch means, responsive to the zener diode passing said current, for generating a voltage signal indicative of a charge on the capacitor;
   a reference circuit for providing a reference voltage which is proportional to the charge on the capacitor;
   a comparator circuit, responsive to the reference voltage, for generating an enable signal when the voltage signal exceeds the reference voltage, wherein the comparator circuit includes feedback circuitry to provide hysterisis control to the enable signal; and
   a second shunting circuit including shunting means, responsive to the enable signal and coupled to the current path on the source side of the current blocking means, for shunting substantially higher levels of current from the current path than the prescribed current levels of the first shunting circuit.

2. A current regulator circuit, according to claim 1, wherein the second shunting circuit further includes second shunting means, responsive to the enable signal and coupled to the current path on the load side of the current blocking means, for shunting current from the current path and discharging the capacitor according to an prescribed time constant.

3. A current regulator circuit, according to claim 1, wherein the feedback circuitry provides positive feedback control with respect to the voltage signal to which the comparator circuit is responsive.

4. A current regulator circuit, according to claim 1, wherein the voltage signal is proportional to the charge on the capacitor.

5. A current regulator circuit, according to claim 1, wherein both the reference voltage and the voltage signal vary with the supply current, and the comparator activates the second circuit only for currents at levels above the second threshold.

6. A current regulator circuit, according to claim 1, wherein the reference voltage is proportional to the supply current.

7. A current regulator circuit, according to claim 6, wherein the reference voltage is about one tenth of the voltage on the capacitor.

8. A current regulator circuit, according to claim 1, wherein the feedback circuitry associated with the comparator circuit provides control for the frequency at which the enable signal is generated so as to limit the generation of noise.

* * * * *